(12) United States Patent
Richard

(10) Patent No.: US 8,550,468 B1
(45) Date of Patent: Oct. 8, 2013

(54) SEAL APPARATUS AND METHODS TO MANUFACTURE THEREOF

(75) Inventor: James A. Richard, Grant, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 1211 days.

(21) Appl. No.: 12/210,843

(22) Filed: Sep. 15, 2008

(51) Int. Cl.
*F16L 5/02* (2006.01)

(52) U.S. Cl.
USPC .......................................... 277/605; 277/611

(58) Field of Classification Search
USPC ................. 277/500, 589, 609, 611, 529, 530, 277/531, 532, 605
See application file for complete search history.

(56) References Cited

U.S. PATENT DOCUMENTS

| | | | |
|---|---|---|---|
| 4,093,241 A | 6/1978 | Muntjanoff et al. | |
| 4,428,589 A | 1/1984 | Reinsma | |
| 4,553,759 A * | 11/1985 | Kilmoyer | 251/214 |
| 4,776,600 A * | 10/1988 | Kohn | 277/611 |
| 5,725,007 A | 3/1998 | Stubbs | |
| 6,135,132 A | 10/2000 | Welker et al. | |
| 6,409,175 B1 | 6/2002 | Evans et al. | |
| 6,471,217 B1 | 10/2002 | Hayfield et al. | |
| 6,719,298 B2 | 4/2004 | Riedl et al. | |
| 6,886,391 B2 | 5/2005 | Kohli et al. | |
| 6,969,231 B2 * | 11/2005 | Ghasripoor et al. | 415/173.4 |
| 7,024,866 B2 * | 4/2006 | Sylvia et al. | 62/6 |
| 2001/0038206 A1 | 11/2001 | Olechnowicz et al. | |
| 2003/0132577 A1 | 7/2003 | Riedl et al. | |

* cited by examiner

*Primary Examiner* — Gilbert Lee
(74) *Attorney, Agent, or Firm* — Michael G. Smith; James J. McGroary

(57) ABSTRACT

In some implementations, apparatus and methods are provided through which a dynamic cryogenic seal is manufactured. In some implementations, the seal includes a retainer and a spring-seal assembly, the assembly being comprised of a main spring housing and fluorine-containing polymer seals. In some implementations, either a radial seal, or an axial (or "piston seal") is provided. In some implementations, methods of manufacturing the dynamic cryogenic seal are also provided. In some implementations, the methods include assembling the components while either heated or cooled, taking advantage of thermal expansion and contraction, such that there is a strong interference fit between the components at room temperature. In some implementations, this process ensures that the weaker fluorine-containing polymer seal is forced to expand and contract with the stronger retainer and spring and is under constant preload. In some implementations, the fluorine-containing polymer is therefore fluidized and retained, and can not lift off.

19 Claims, 28 Drawing Sheets

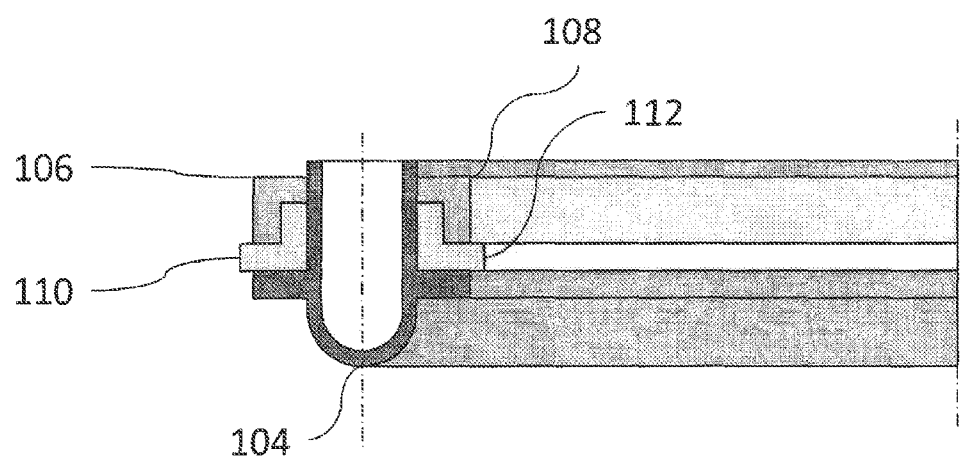
FIG. 3

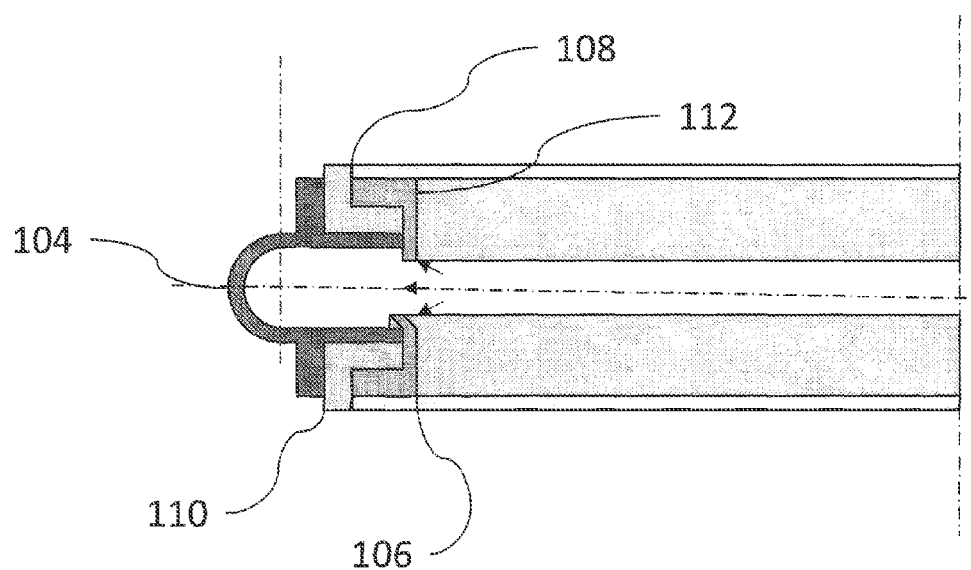
FIG. 8

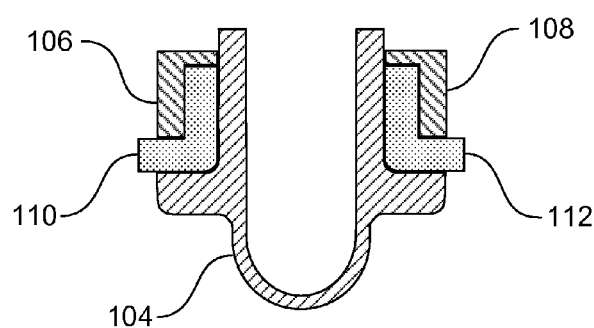
FIG. 20

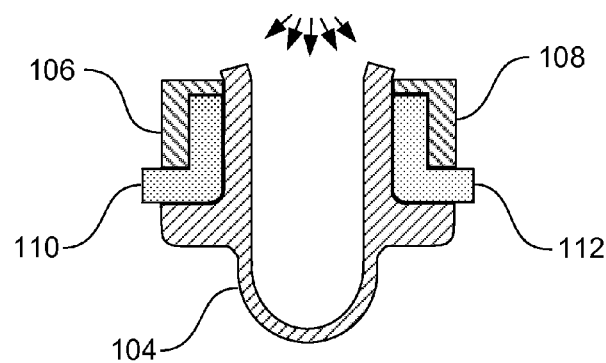
FIG. 21

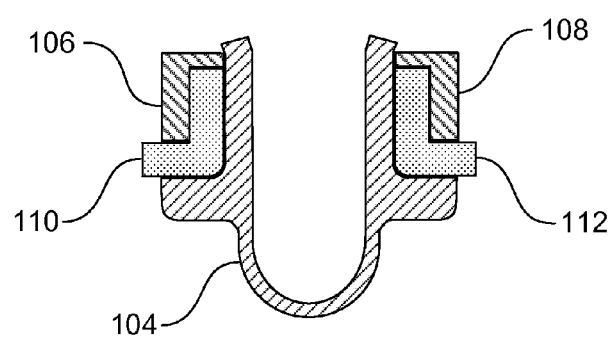
FIG. 22
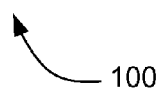

SEAL APPARATUS AND METHODS TO MANUFACTURE THEREOF

ORIGIN OF THE INVENTION

The invention described herein was made by an employee of the United States Government and may be manufactured and used by or for the government of the United States of America for governmental purposes without the payment of any royalties thereon or therefore.

FIELD OF THE INVENTION

This invention relates generally to seals, and more particularly to dynamic cryogenic seals.

BACKGROUND OF THE INVENTION

Typical dynamic cryogenic seals use either a plastic jacket with a mechanical spring to energize the seal or a plastic coating on a mechanical seal. These are limited in life due to the high loads resulting from coefficient of thermal expansion (CTE) mismatch of the plastic and metallic parts, or the plastic coatings wear off with motion.

While many efforts have been made to improve plastic cryogenic seals, the state of the art designs all suffer from rolling or sliding of the weak plastic parts as the dynamic surfaces pass by. Metallic parts wear the plastic coating off after several cycles.

For the reasons stated above, and for other reasons stated below which will become apparent to those skilled in the art upon reading and understanding the present specification, there is a need in the art for improved dynamic cryogenic seal design.

BRIEF DESCRIPTION OF THE INVENTION

The above-mentioned shortcomings, disadvantages and problems are addressed herein, which will be understood by reading and studying the following specification.

A dynamic cryogenic seal is provided. The seal includes a spring-seal assembly and retainers. The spring-seal assembly is comprised of a main spring housing and fluorine-containing polymer seals. The seal may be configured in either a radial implementation, or an axial ("pistol seal") implementation.

Methods of manufacturing the dynamic cryogenic seal are also provided. The methods include assembling the components while either heated or cooled, taking advantage of thermal expansion and contraction, such that there is a strong interference fit between the components at room temperature. This process ensures that the weaker fluorine-containing polymer seals are forced to expand and contract with the stronger metallic retainers and spring, and are under constant preload. Thus the fluorine-containing polymer is fluidized and retained, and can not lift off.

Apparatus and methods of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 3 is an isometric cross-sectional diagram an illustrative seal according to an implementation to provide an axial, or "piston," seal;

FIG. 8 is an isometric cross-sectional diagram of an illustrative seal according to an implementation to provide a radial seal;

FIG. 20 is a cross-sectional diagram of an illustrative seal according to an implementation to provide an axial, or "piston," seal;

FIG. 21 is a cross-sectional diagram of an illustrative seal according to an implementation to provide an axial, or "piston," seal;

FIG. 22 is a cross-sectional diagram of an illustrative seal according to an implementation to provide an axial, or "piston," seal;

DETAILED DESCRIPTION OF THE INVENTION

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into three sections. In the first section, apparatus of implementations are described. In the second section, implementations of methods are described. Finally, in the third section, a conclusion of the detailed description is provided.

Apparatus Implementations

Figure 1:
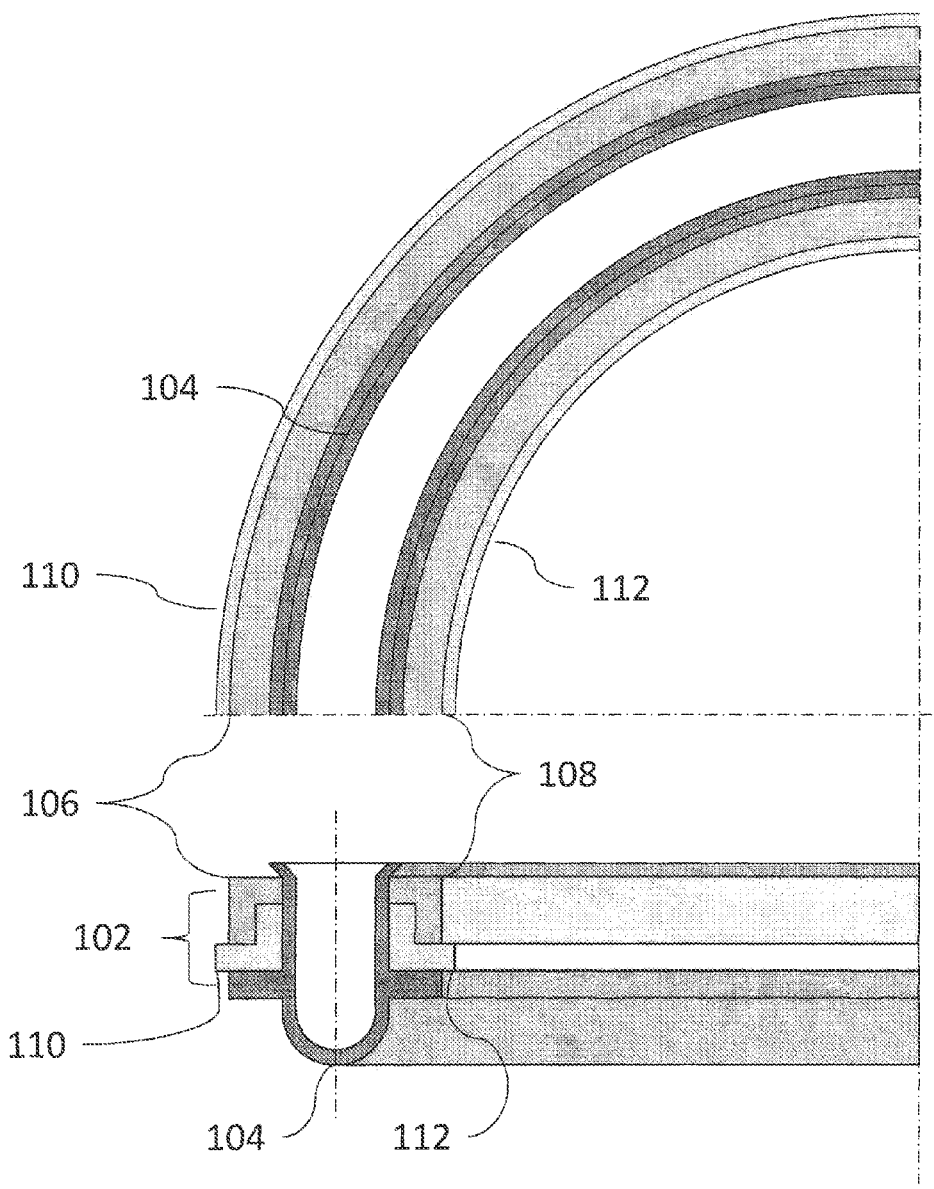
FIG. 1 is an isometric cross-sectional diagram of an illustrative seal according to an implementation to provide an axial, or "piston," seal.

FIG. 1 is an isometric cross-sectional diagram of illustrative seal 100 according to an implementation to provide an axial, or "piston," seal. Seal 100 solves the need in the art to achieve an effective seal in a cryogenic environment by avoiding the problems conventional seals encountered due to the high loads resulting from coefficient of thermal expansion (CTE) mismatch between plastic and metallic parts, premature wear of the weaker plastic parts caused by metallic parts, and rolling or sliding as the dynamic parts pass by. In this illustration, seal 100 is implemented in such a way to provide an effective seal for an axially moveable object within a concentric passage.

Seal 100 comprises an assembly, e.g. assembly 102, and a retainer, e.g. retainers 106 and 108, which is coupled to assembly 102. Assembly 102 comprises a main spring housing, e.g. housing 104, assembled with a fluorine-containing polymer seal, e.g. seal rings 110 and 112, wherein the fluorine-containing polymer bears compressive loads and wherein the fluorine-containing polymer has a fluidized state.

Seal rings 110 and 112 must be weaker than retainers 106 and 108, as well as housing 104. This ensures seal rings 110 and 112 follow retainer rings 106 and 108, as well as housing 104, as seal 100 expands and contracts in response to temperature changes. By forcing seal rings 110 and 112 to follow retainer rings 104 and 106, as well as housing 104, the fluorine-containing polymer contained therein is kept under constant pressure, thus fluidizing and retaining the fluorine-containing polymer. Therefore, the fluorine-containing polymer does not crack or split as the mechanical parts move.

The fluidized fluorine-containing polymer stays in the swaged gland volume as the free surface of seal rings 110 and 112 are able to "freeze" and plug the fluidized fluorine-containing polymer from flowing out. As pressure is applied to the face of seal rings 110 and 112, the fluidized material below the surface acts as a spring and keeps the solid surface in contact with the small imperfections of the dynamic surface, housing 104 moves the seal for larger deflections, and the pressure energized features keep the pressure in seal 100 above the system pressure, thus providing a leak free seal under dynamic applications. Seal 100 also has the ability to be easily replaced as needed.

Figure 2:
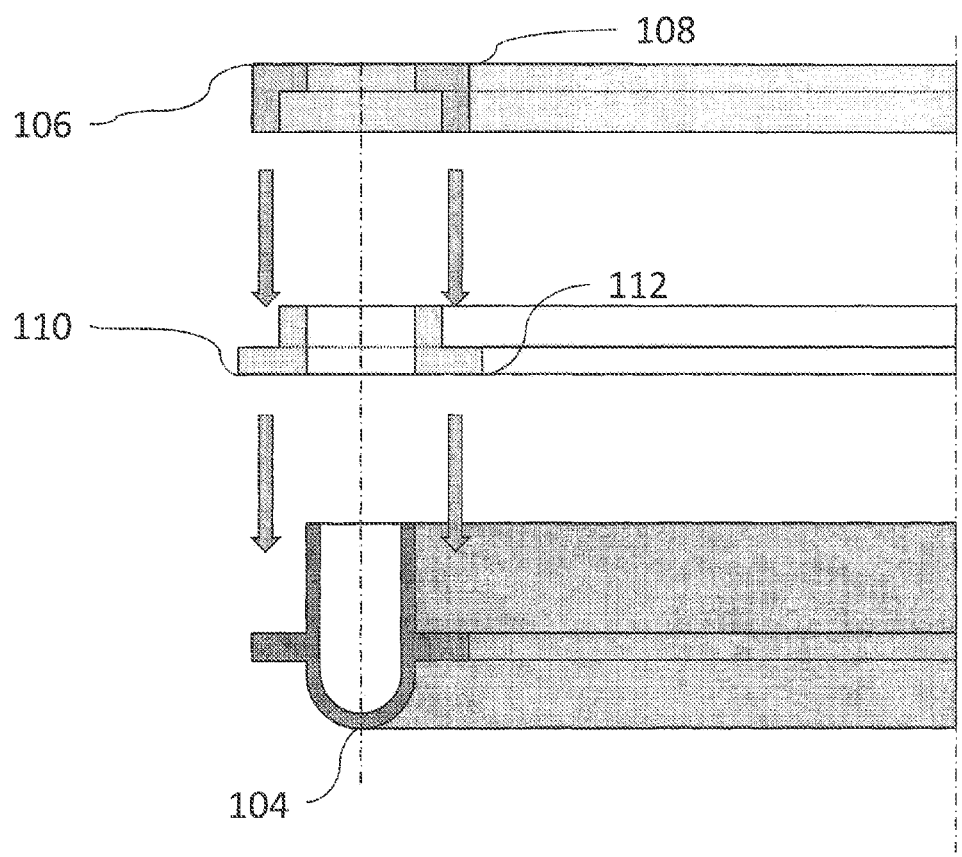
FIG. 2 is an exploded isometric cross-sectional diagram of an illustrative seal according to an implementation to provide an axial, or "piston," seal.

FIG. 2 is an exploded isometric cross-sectional diagram of illustrative seal 100 according to an implementation to provide an axial, or "piston," seal. In order to avoid the high loads resulting from CTE mismatch, premature wear, and rolling or sliding, seal rings 110 and 112 can be formed from a fluorine-containing polymer. Suitable materials for forming seal rings 110 and 112 include, but are not limited to, polytetrafluoroethylene (Teflon), perfluoroalkoxy (Teflon-PFA), and fluorinated ethylene propylene (Teflon-FEP). A high-strength material must be used to form retainers 106 and 108, as well as housing 104. This material cannot move more than a specified, controlled amount, and must be able to withstand the seal stress. Suitable materials for forming retainers 106 and 108, as well as housing 104, include, but are not limited to an austenitic nickel-based superalloy and stainless steel.

FIG. 3 is an isometric cross-sectional diagram of seal 100 according to an implementation to provide an axial, or "piston," seal. In FIG. 3, the edges of retainers 106 and 108 have not yet been swaged over housing 104.

Figure 4:
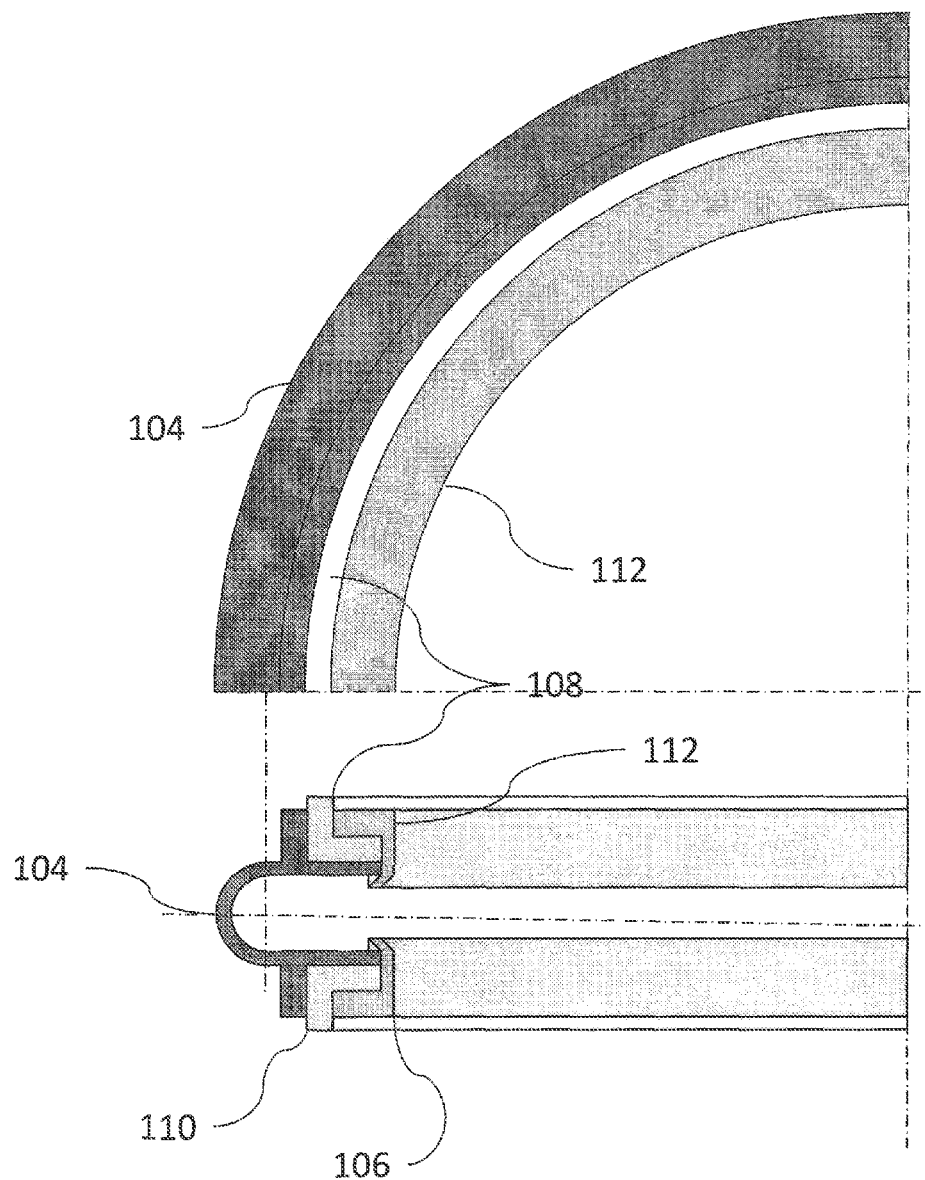
FIG. 4 is an isometric diagram of an illustrative seal according to an implementation to provide a radial seal.

FIG. 4 is an isometric diagram of illustrative seal 100 according to an implementation to provide a radial seal. In this illustration, seal 100 is implemented in such a way to provide an effective seal for the radial gap between objects. Housing 104, retainers 106 and 108, and seal ring 110 are all shown.

Figure 5:
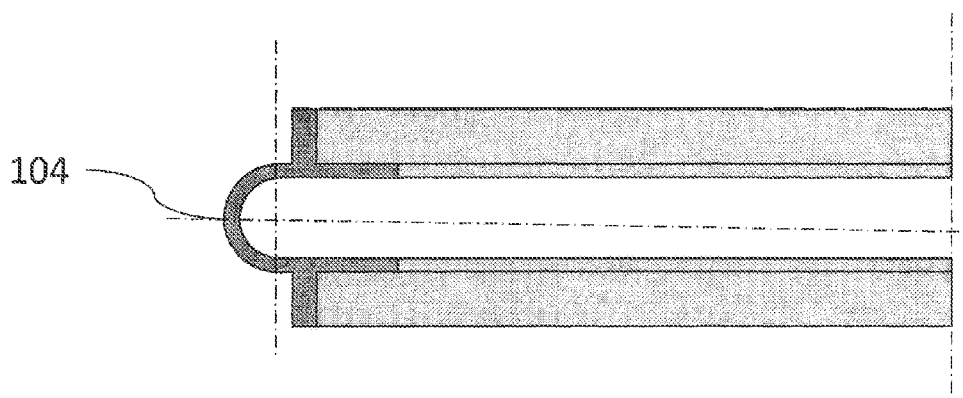
FIG. 5 is an isometric cross-sectional diagram of an illustrative main spring housing according to an implementation to provide a radial seal.

FIG. 5 is an isometric cross-sectional diagram of housing 104 according to an implementation to provide a radial seal. In this illustration, retainer 104 is shown prior to assembly or swaging. Prior to assembly, housing 104 is cooled in liquid nitrogen.

Figure 6:
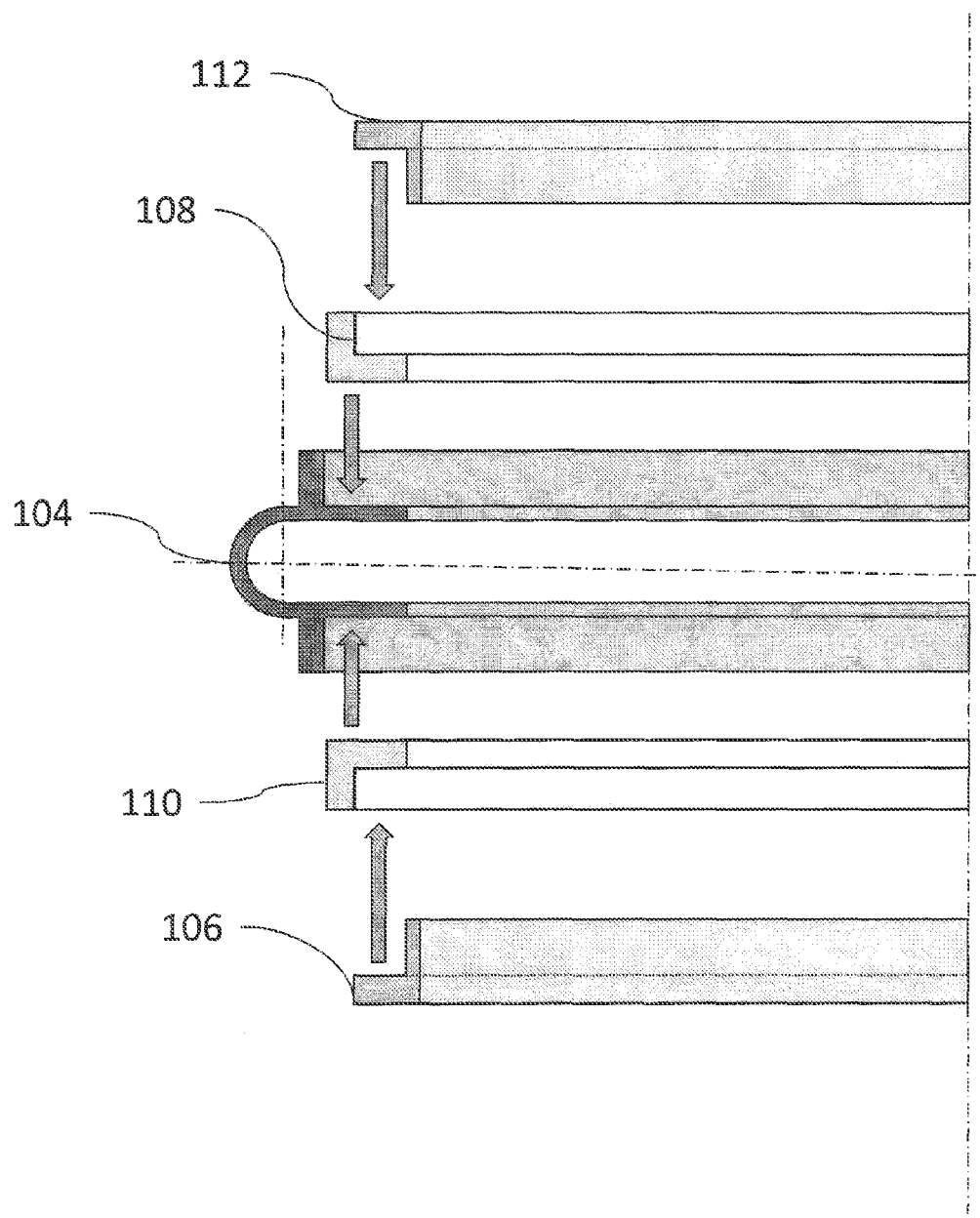
FIG. 6 is an exploded isometric cross-sectional diagram of an illustrative fluorine-containing polymer seal and retainer according to an implementation to provide a radial seal.

FIG. 6 is an exploded isometric cross-sectional diagram of seal ring 112 and retainer 108 according to an implementation to provide a radial seal. In this illustration, seal ring 112 and retainer 108 are shown prior to assembly. Prior to assembly, both seal ring 112 and retainer 108 are heated to approximately 300 degrees Fahrenheit.

Figure 7:
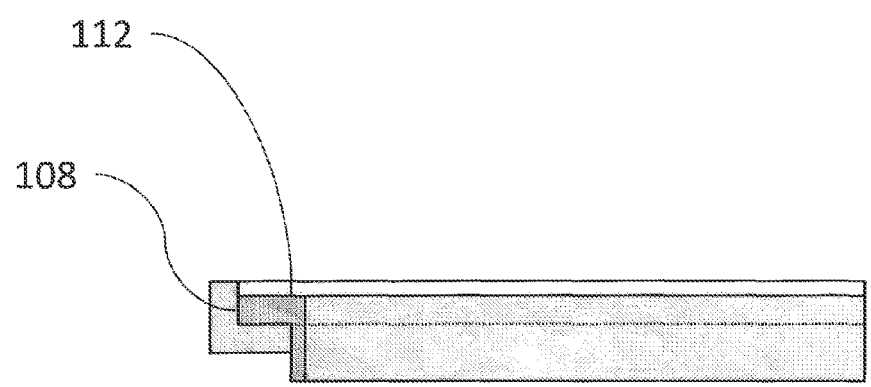
FIG. 7 is an isometric cross-sectional diagram of an illustrative fluorine-containing polymer seal and retainer according to an implementation to provide a radial seal.

FIG. 7 is an isometric cross-sectional diagram of seal ring 112 and retainer 108 according to an implementation to provide a radial seal. In this illustration, seal ring 112 and retainer 108 are shown subsequent to assembly. The main spring housing is not shown. Retainer 108 is shown prior to swaging.

FIG. 8 is an isometric cross-sectional diagram of seal 100 according to an implementation to provide a radial seal. In this illustration, seal 100 is shown fully assembled. Force sufficient to swage retainers 106 and 108 is applied, ensuring the fluorine-containing polymer contained in seal rings 110 and 112 is captured. After swaging, the face of seal rings 110 and 112 are trued flat.

Figure 9:
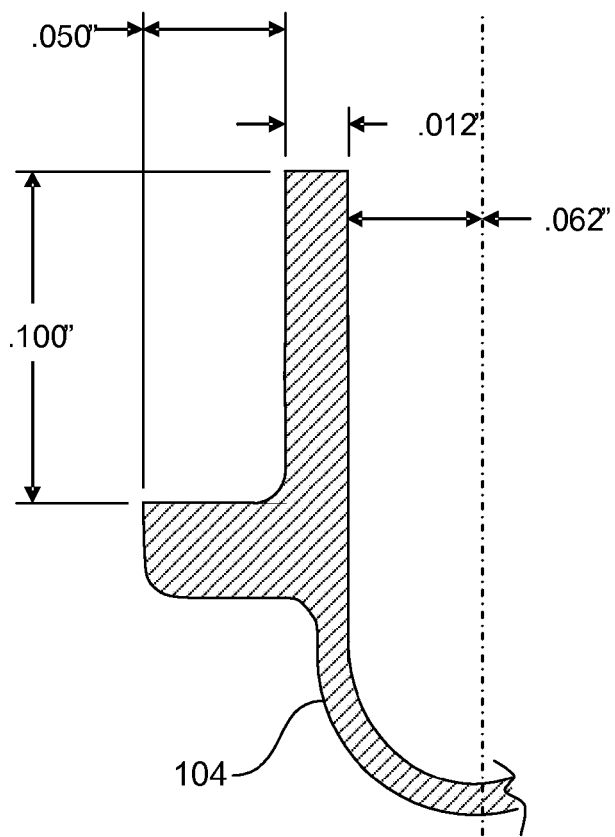
FIG. 9 is a cross-sectional diagram of an illustrative main spring housing according to an implementation to provide an axial, or "piston," seal.

FIG. 9 is a cross-sectional diagram of housing 104 according to an implementation to provide an axial, or "piston," seal. In this illustration, the main spring housing, housing 104, is shown prior to assembly. Illustrative dimensions are also shown.

Figure 10:
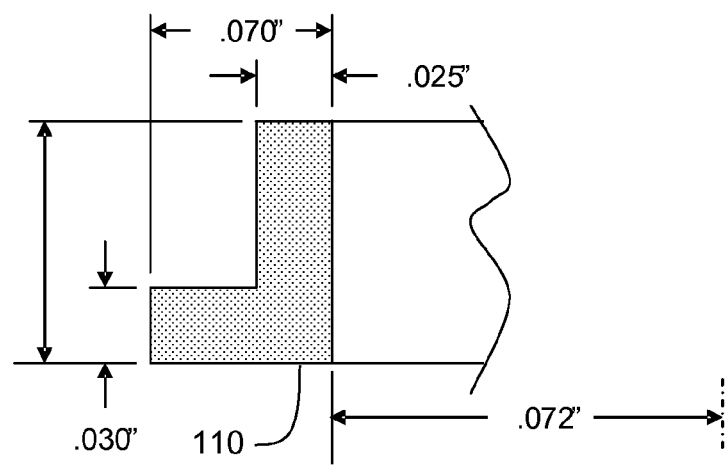
FIG. 10 is a cross-sectional diagram of an illustrative fluorine-containing polymer seal according to an implementation to provide an axial, or "piston," seal.

FIG. 10 is a cross-sectional diagram of seal ring 110 according to an implementation to provide an axial, or "piston," seal. In this illustration, the outboard seal, seal ring 110, is shown prior to assembly. Illustrative dimensions are also shown. The inboard seal ring mirrors the dimensions of seal ring 110.

Figure 11:
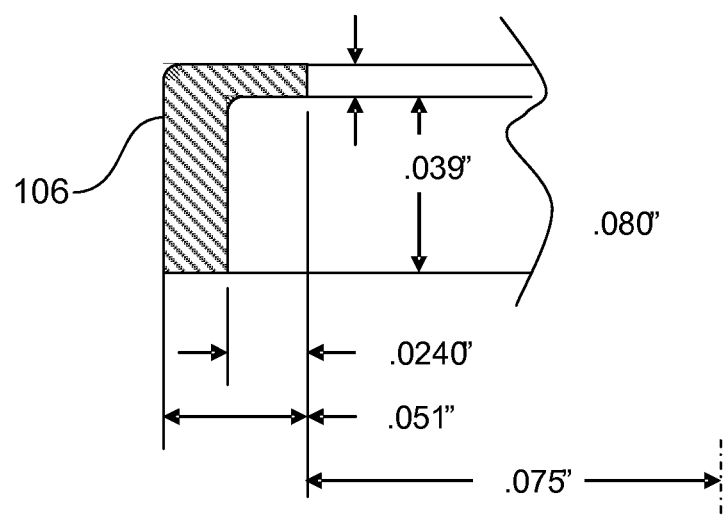
FIG. 11 is a cross-sectional diagram of an illustrative retainer according to an implementation to provide an axial, or "piston," seal.

FIG. 11 is a cross-sectional diagram of retainer 106 according to an implementation to provide an axial, or "piston," seal.

In this illustration, the outboard retainer, retainer 106, is shown prior to assembly. Illustrative dimensions are also shown. The inboard retainer mirrors the dimensions of retainer 106.

Figure 12:
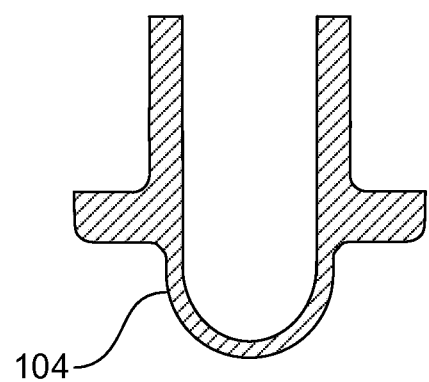
FIG. 12 is a cross-sectional diagram of an illustrative main spring housing according to an implementation to provide an axial, or "piston," seal.

FIG. 12 is a cross-sectional diagram of housing 104 according to an implementation to provide an axial, or "piston," seal. In this illustration, housing 104 is shown prior to assembly.

Figure 13:
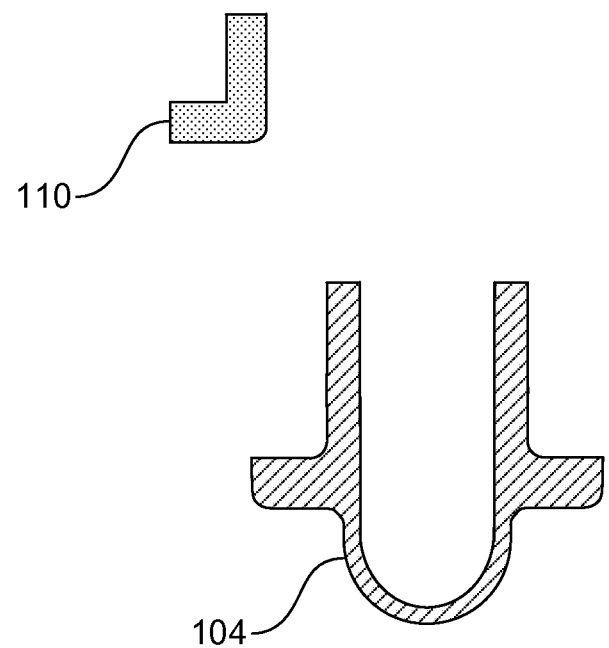
FIG. 13 is a cross-sectional diagram of an illustrative main spring housing and fluorine-containing polymer seal according to an implementation to provide an axial, or "piston," seal.

FIG. 13 is a cross-sectional diagram of housing 104 and seal ring 110 according to an implementation to provide an axial, or "piston," seal. In this illustration, housing 104 and seal ring 110 are shown prior to assembly. Before assembling, housing 104 will be cooled and seal ring 110 will be heated.

Figure 14:
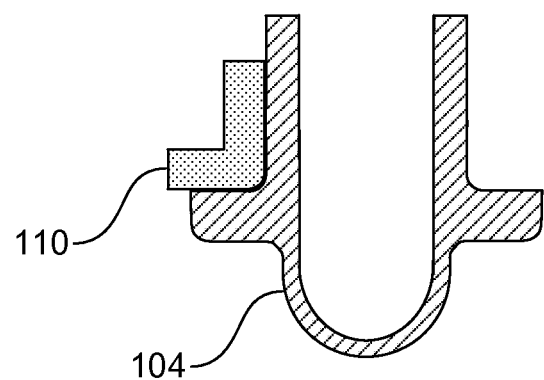
FIG. 14 is a cross-sectional diagram of an illustrative main spring housing and fluorine-containing polymer seal according to an implementation to provide an axial, or "piston," seal.

FIG. 14 is a cross-sectional diagram of housing 104 and seal ring 110 according to an implementation to provide an axial, or "piston," seal. In this illustration, cooled housing 104 and heated seal ring 110 are shown subsequent to assembly. The assembly process is performed while housing 104 remains cooled and seal ring 110 remains heated. At room temperature, there is an interference fit between the components.

Figure 15:
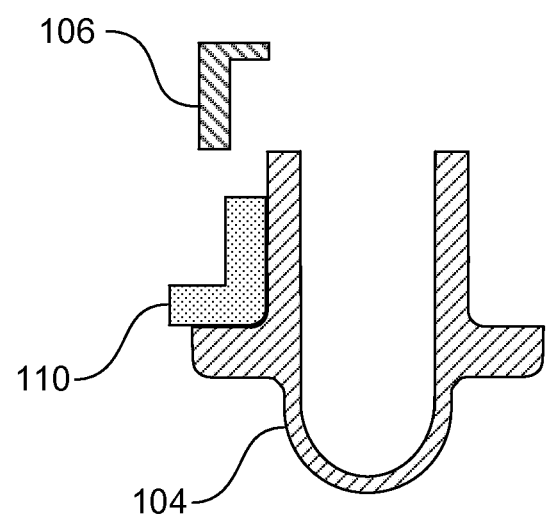
FIG. 15 is a cross-sectional diagram of an illustrative main spring housing, fluorine-containing polymer seal, and retainer according to an implementation to provide an axial, or "piston," seal.

FIG. 15 is a cross-sectional diagram of housing 104, seal ring 110, and retainer 106 according to an implementation to provide an axial, or "piston," seal. In this illustration, retainer 106 is shown prior to assembly with housing 104 and seal ring 110. Before assembling, housing 104 and seal ring 110 will be cooled, and retainer 106 will be heated.

Figure 16:
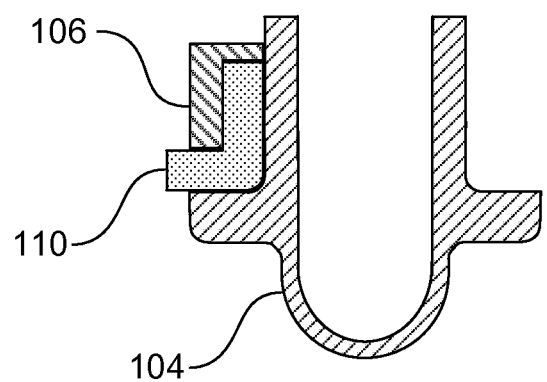
FIG. 16 is a cross-sectional diagram of an illustrative main spring housing, fluorine-containing polymer seal, and retainer according to an implementation to provide an axial, or "piston," seal.

FIG. 16 is a cross-sectional diagram of housing 104, seal ring 110, and retainer 106 according to an implementation to provide an axial, or "piston," seal. In this illustration, cooled housing 104, cooled seal ring 110, and heated retainer 106 are shown subsequent to assembly. The assembly process is performed while housing 104 and seal ring 110 remain cooled, and retainer 106 remains heated. At room temperature, there is an interference fit between the components.

Figure 17:
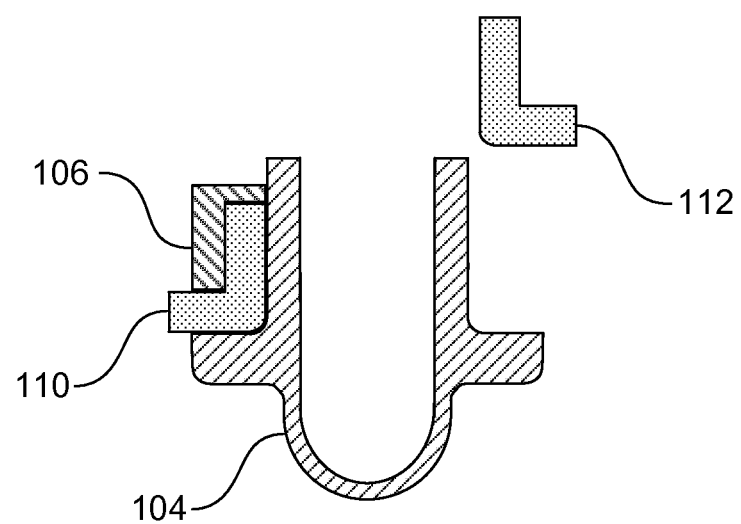
FIG. 17 is a cross-sectional diagram of an illustrative main spring housing, fluorine-containing polymer seals, and retainer according to an implementation to provide an axial, or "piston," seal.

FIG. 17 is a cross-sectional diagram of housing 104, seal rings 110 and 112, and retainer 106 according to an implementation to provide an axial, or "piston," seal. In this illustration, seal ring 112 is shown prior to assembly with housing 104, seal ring 110 and retainer 106. Before assembling, housing 104, seal ring 110, and retainer 106 will be heated, and seal ring 112 will be cooled.

Figure 18:
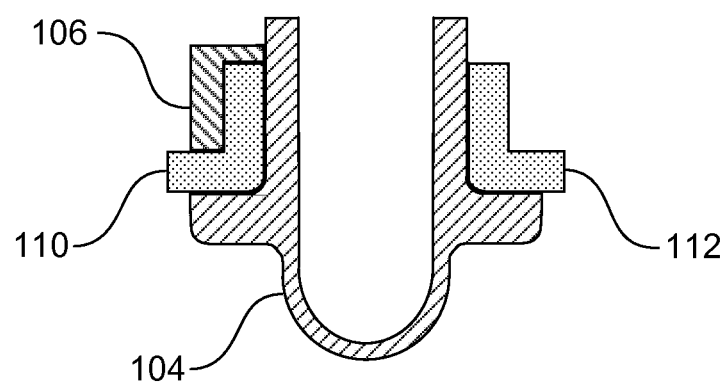
FIG. 18 is a cross-sectional diagram of an illustrative main spring housing, fluorine-containing polymer seals, and retainer according to an implementation to provide an axial, or "piston," seal.

FIG. 18 is a cross-sectional diagram of housing 104, seal rings 110 and 112, and retainer 106 according to an implementation to provide an axial, or "piston," seal. In this illustration, heated housing 104, heated seal ring 110, heated retainer 106, and cooled seal ring 112 are shown subsequent to assembly. The assembly process is performed while housing 104, seal ring 110 and retainer 106 remain heated, and seal ring 112 remains cooled. At room temperature, there is an interference fit between the components.

Figure 19:
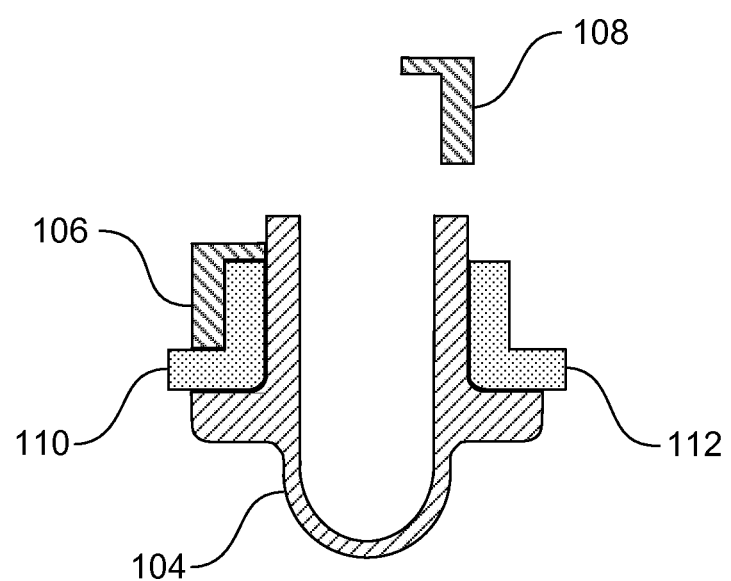
FIG. 19 is a cross-sectional diagram of an illustrative main spring housing, fluorine-containing polymer seals, and retainers according to an implementation to provide an axial, or "piston," seal.

FIG. 19 is a cross-sectional diagram of housing 104, seal rings 110 and 112, and retainers 106 and 108 according to an implementation to provide an axial, or "piston," seal. In this illustration, retainer 108 is shown prior to assembly with housing 104, seal rings 110 and 112, and retainer 106. Before assembling, housing 104, seal rings 110 and 112, and retainer 106 will be heated, and retainer 108 will be cooled.

FIG. 20 is a cross-sectional diagram of seal 100 according to an implementation to provide an axial, or "piston," seal. In this illustration, heated housing 104, heated seal rings 110 and 112, heated retainer 106, and cooled retainer 108 are shown subsequent to assembly. The assembly process is performed while housing 104, seal rings 110 and 112, and retainer 106 remain heated, and retainer 108 remains cooled. At room temperature, there is an interference fit between the components. Housing 104 is shown prior to swaging.

FIG. 21 is a cross-sectional diagram of seal 100 according to an implementation to provide an axial, or "piston," seal. In this illustration, housing 104 is shown subsequent to swaging. Force sufficient to swage housing 104 is applied, ensuring the fluorine-containing polymer contained in seal rings 110 and 112 is captured.

FIG. 22 is a cross-sectional diagram of seal 100 according to an implementation to provide an axial, or "piston," seal. In this illustration seal rings 110 and 112 are shown subsequent to being trimmed and finished to a true flat.

Figure 23:
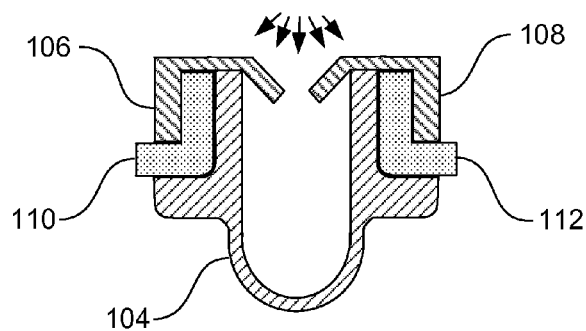
FIG. 23 is a cross-sectional diagram of an illustrative seal according to either an implementation to provide a radial seal or an implementation to provide an axial, or "piston," seal.
Figure 23:

FIG. 23 is a cross-sectional diagram of seal 100 according to either an implementation to provide a radial seal or an implementation to provide an axial, or "piston," seal. In this illustration, retainers 106 and 108 are shown subsequent to swaging over housing 104. Force sufficient to swage retainers 106 and 108 is applied, ensuring the fluorine-containing polymer contained in seal rings 110 and 112 is captured.

Figure 24:
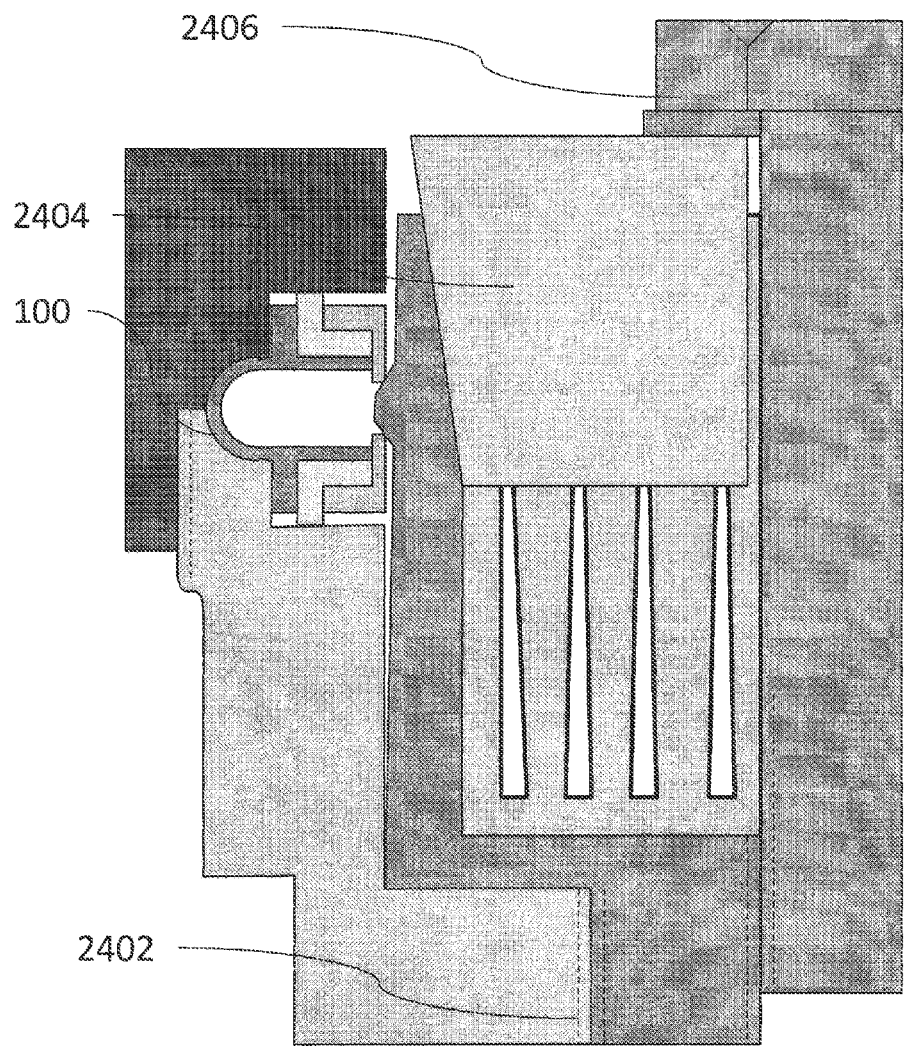
FIG. 24 is a cut-away diagram of an illustrative swaging tool and seal.

FIG. 24 is a cut-away diagram of swaging tool 2400 and seal 100 according to an implementation to provide a radial seal. Swaging tool 2400 comprises a component that is operable to trap liquid fluorine-containing polymer; is operable to compress the fluorine-containing polymer; and is operable to swage the retainer or the main spring housing. Swaging tool 2400 further comprises a drive shaft, e.g. drive shaft 2402, having a first end and a second end, the first end operable coupled to the component that is operable to swage the retainer or the main spring housing; a cap, e.g. cap 2404, having a circular hole, the drive shaft extending through the hole; and a nut, e.g. nut 2406, operably coupled to the second end of the drive shaft. The component that is operable to trap further comprises a seal, e.g. seal 100.

Figure 25:
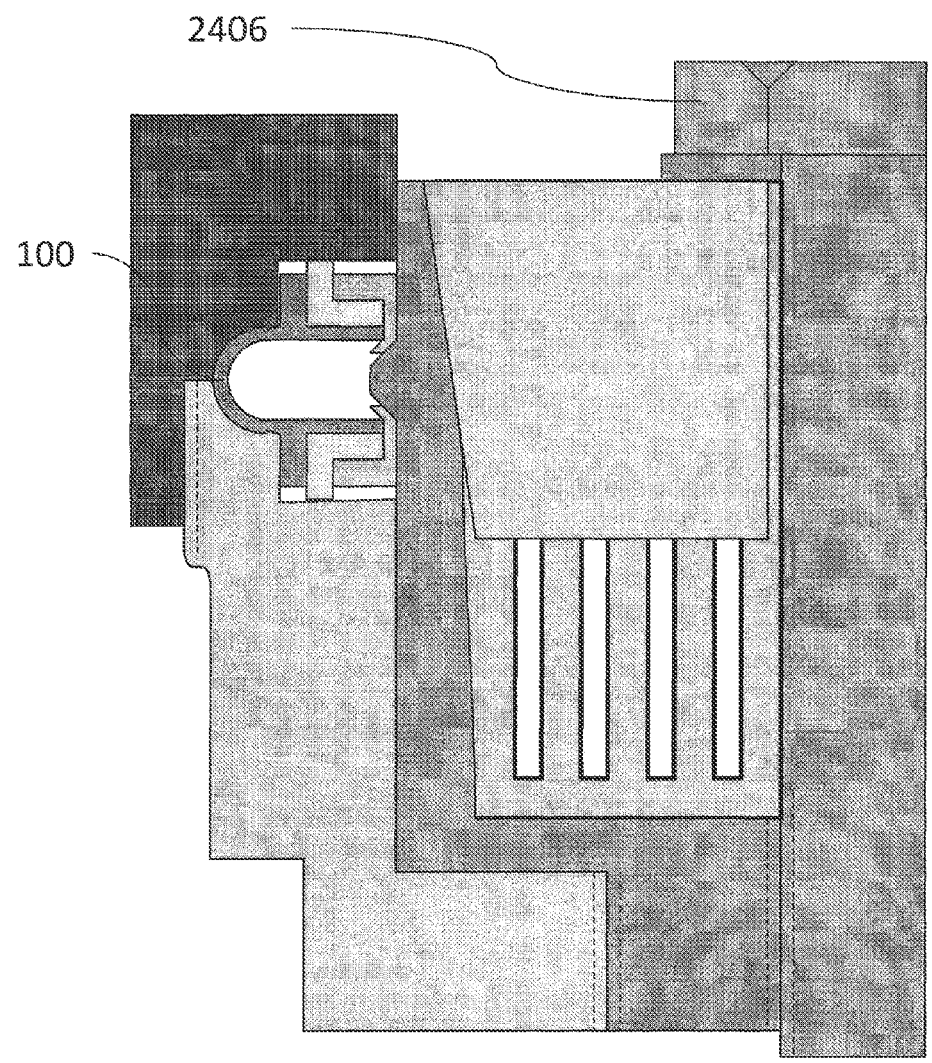
FIG. 25 is a cut-away diagram of an illustrative swaging tool and seal.

FIG. 25 is a cut-away diagram of swaging tool 2400 and seal 100 according to an implementation to provide a radial seal. In this illustration, nut 2406 is visible, as is seal 100.

Method Implementations

In the previous section, apparatus of the operation of an implementation was described. In this section, the particular methods performed by such an implementation are described by reference to a series of flowcharts.

Figure 26:
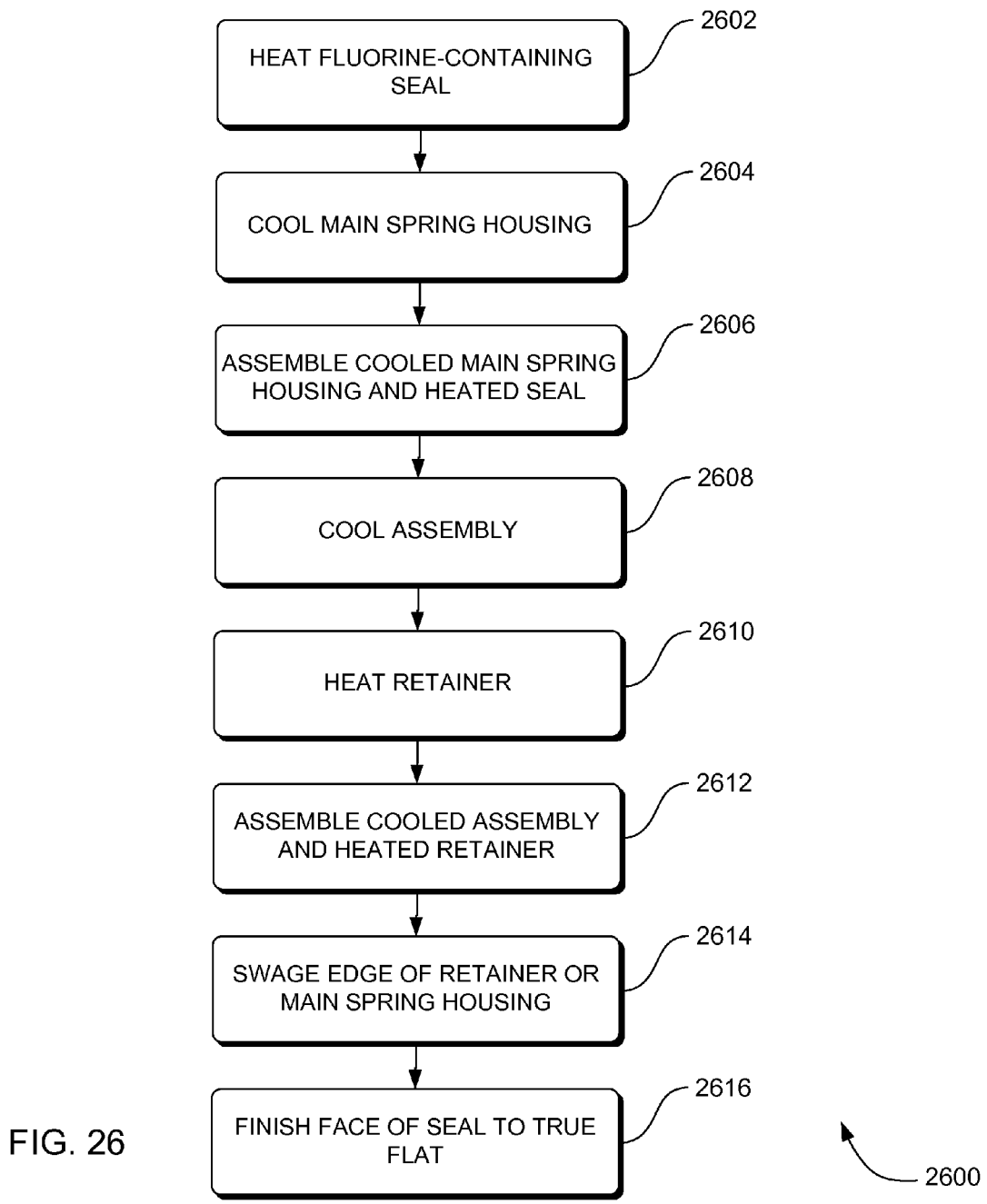
FIG. 26 is a flowchart of a method manufacture a seal.

FIG. 26 is a flowchart of a method manufacture a seal. Method 2600 solves the need in the art to achieve an effective seal in a cryogenic environment by avoiding the problems conventional seals encountered due to the high loads resulting from coefficient of thermal expansion (CTE) mismatch between plastic and metallic parts, premature wear of the weaker plastic parts caused by metallic parts, and rolling or sliding as the dynamic parts pass by.

A fluorine-containing polymer seal, e.g. seal rings 110 and 112, is heated at block 2602. The seal may be heated to about 300 degrees Fahrenheit. The fluorine-containing polymer may be comprised of polytetrafluoroethylene (Teflon), perfluoroalkoxy (Teflon-PFA), or fluorinated ethylene propylene (Teflon-FEP).

A main spring housing, e.g. housing 104, is cooled at block 2604. The main spring housing may be cooled in liquid nitrogen.

The heated main spring housing and the cooled seal are assembled, forming an assembly, e.g. assembly 102, at block 2606. At room temperature, there is an interference fit between the two. The Teflon is weaker so it follows the main spring housing as it warms.

The assembly, e.g. assembly 102, is cooled at block 2608. The assembly may be cooled in liquid nitrogen.

A retainer, e.g. retainers 106 and 108, is heated at block 2610. The retainer may be heated to about 300 degrees Fahrenheit.

The cooled assembly and the heated retainer are assembled at block 2612. At room temperature, there is an interference fit between the components.

Swaging is performed on the edge of the retainer or the main spring housing at block 2614. The swaging may be performing with a swaging tool that comprises a drive shaft having a first end and a second end, the first end operable coupled to the component that is operable to swage the retainer or the main spring housing; a cap having a circular hole, the drive shaft extending through the hole; and a nut operably coupled to the second end of the drive shaft. Swaging the edge of the retainer or the main spring housing further comprises trapping the fluorine-containing polymer; compressing the fluorine-containing polymer; and swaging either the retainer or the main spring housing.

The face of the seal is finished to true flat at block 2616.

Figure 27:
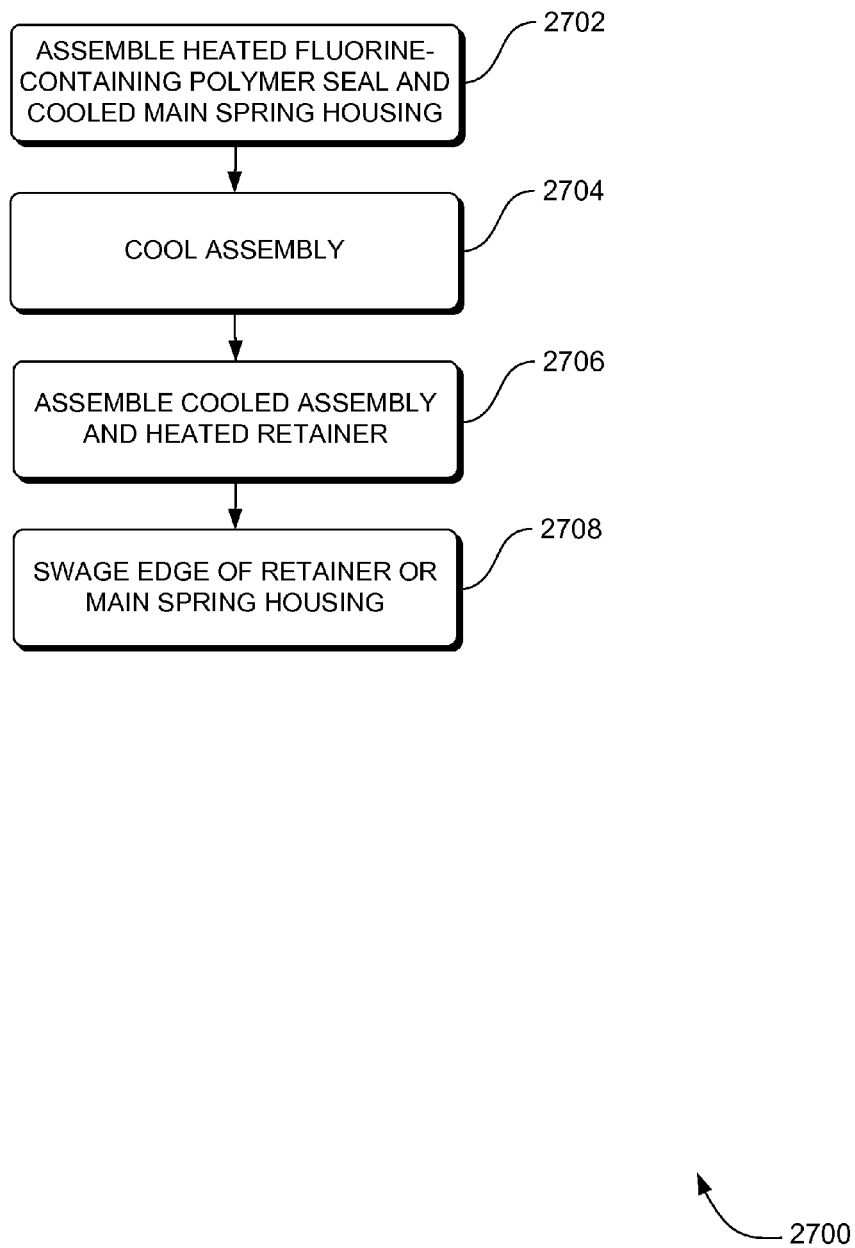
FIG. 27 is a flowchart of a method manufacture a seal.

FIG. 27 is a flowchart of a method manufacture a seal. Method 2700 solves the need in the art to achieve an effective seal in a cryogenic environment by avoiding the problems conventional seals encountered due to the high loads resulting from coefficient of thermal expansion (CTE) mismatch between plastic and metallic parts, premature wear of the weaker plastic parts caused by metallic parts, and rolling or sliding as the dynamic parts pass by.

A heated fluorine-containing polymer seal, e.g. seal rings 110 and 112, and a cooled main spring housing, e.g. housing 104, are assembled at block 2702.

This assembly, e.g. assembly 102, is cooled at block 2704.

The cooled assembly and a heated retainer, e.g. retainers 106 and 108, are assembled at block 2706.

Swaging is performed on the edge of the retainer or the main spring housing at block 2708. The swaging may be performing with a swaging tool that comprises a drive shaft having a first end and a second end, the first end operable coupled to the component that is operable to swage the retainer or the main spring housing; a cap having a circular hole, the drive shaft extending through the hole; and a nut operably coupled to the second end of the drive shaft. Swaging the edge of the retainer further comprises trapping the fluorine-containing polymer; compressing the fluorine-containing polymer; and swaging the retainer.

Figure 28:
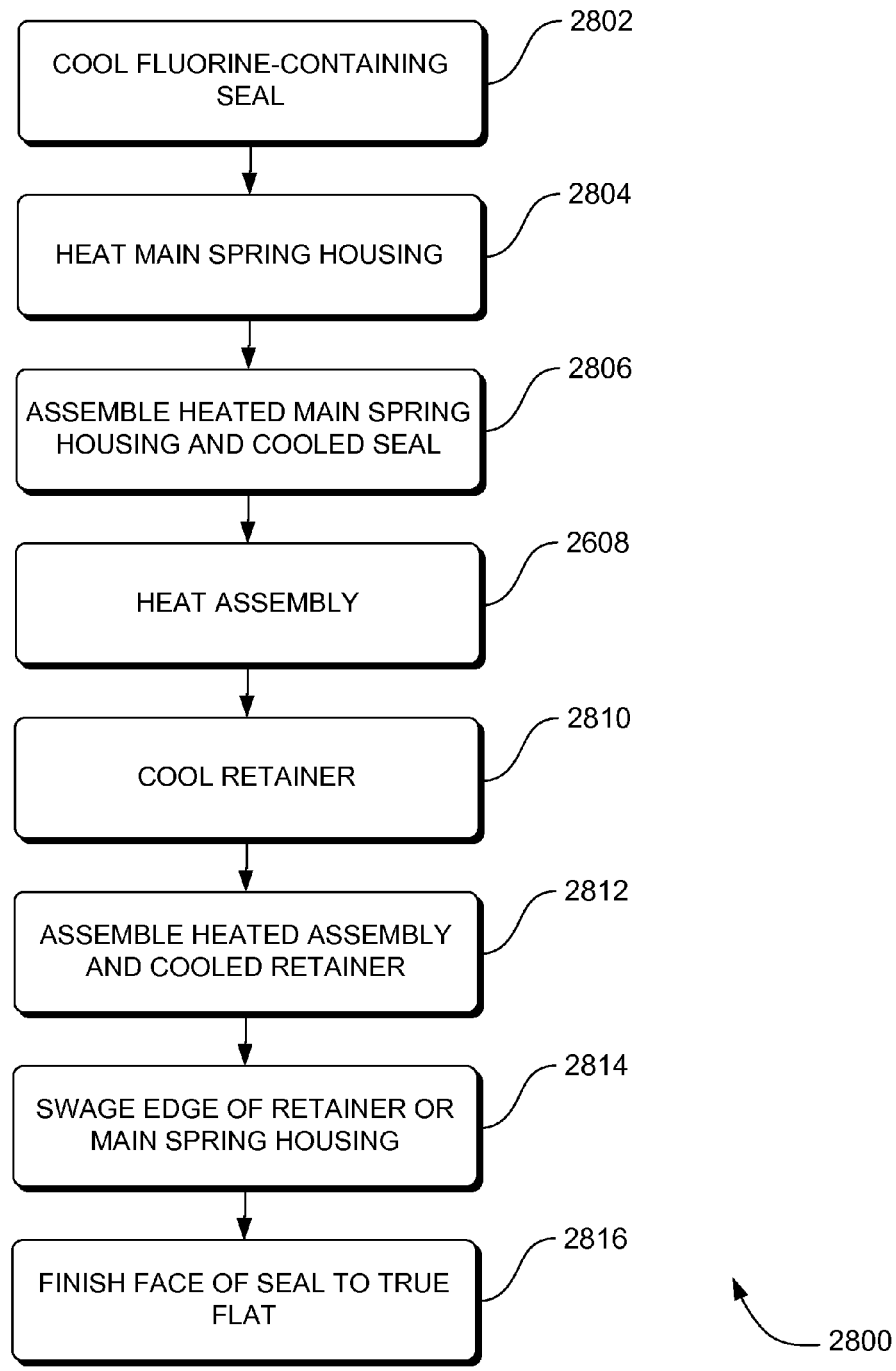
FIG. 28 is a flowchart of a method manufacture a seal.

FIG. 28 is a flowchart of a method manufacture a seal. Method 2800 solves the need in the art to achieve an effective seal in a cryogenic environment by avoiding the problems conventional seals encountered due to the high loads resulting from coefficient of thermal expansion (CTE) mismatch between plastic and metallic parts, premature wear of the weaker plastic parts caused by metallic parts, and rolling or sliding as the dynamic parts pass by.

A fluorine-containing polymer seal, e.g. seal rings 110 and 112, is cooled at block 2802. The seal may be cooled in liquid nitrogen. The fluorine-containing polymer may be comprised of polytetrafluoroethylene (Teflon), perfluoroalkoxy (Teflon-PFA), or fluorinated ethylene propylene (Teflon-FEP).

A main spring housing, e.g. housing 104, is heated at block 2804. The main spring housing may be heated to about 300 degrees Fahrenheit.

The heated main spring housing and the cooled seal are assembled, forming an assembly, e.g. assembly 102, at block 2806. At room temperature, there is an interference fit between the two. The Teflon is weaker so it follows the main spring housing as it warms.

The assembly, e.g. assembly 102, is heated at block 2808. The assembly may be heated to about 300 degrees Fahrenheit.

A retainer, e.g. retainers 106 and 108, is cooled at block 2810. The retainer may be cooled in liquid nitrogen.

The heated assembly and the cooled retainer are assembled at block 2812. At room temperature, there is an interference fit between the components.

Swaging is performed on the edge of the retainer or the main spring housing at block 2814. The swaging may be performing with a swaging tool that comprises a drive shaft having a first end and a second end, the first end operable coupled to the component that is operable to swage the retainer or the main spring housing; a cap having a circular hole, the drive shaft extending through the hole; and a nut operably coupled to the second end of the drive shaft. Swaging the edge of the retainer or the main spring housing further comprises trapping the fluorine-containing polymer; compressing the fluorine-containing polymer; and swaging either the retainer or the main spring housing.

The face of the seal is finished to true flat at block 2816.

CONCLUSION

A dynamic cryogenic seal is described. Although specific implementations are illustrated and described herein, it will be appreciated by those of ordinary skill in the art that any arrangement which is calculated to achieve the same purpose may be substituted for the specific implementations shown. This application is intended to cover any adaptations or variations. For example, although the main spring housing and retainers are described as being comprised of stainless steel or an austenitic nickel-based superalloy, one of ordinary skill in the art will appreciate that implementations can be made in other metals that provide the required function.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future dynamic cryogenic seal devices, different dynamic cryogenic seals, and new dynamic cryogenic seals.

The terminology used in this application is meant to include all seals, and dynamic cryogenic seal environments and alternate technologies which provide the same functionality as described herein.

We claim:

1. An apparatus comprising:
   an assembly comprising a main spring housing assembled with a cryogenic fluorine-containing polymer seal, wherein the fluorine-containing polymer bears compressive loads and wherein the fluorine-containing polymer has a fluidized state; and
   a retainer coupled to the assembly,
   wherein the cryogenic fluorine-containing polymer seal is weaker than the retainer providing that when the cryogenic fluorine-containing polymer seal expands and contracts in response to temperature changes the seal follows the retainer which provides that the fluorine-containing polymer contained in the seal is under constant pressure, thus fluidizing and retaining the fluorine-containing polymer.

2. The apparatus of claim 1 wherein the main spring housing further comprises:
   an austenitic nickel-based superalloy.

3. The apparatus of claim 1 wherein the main spring housing further comprises:

stainless steel.

4. The apparatus of claim 1 wherein the fluorine-containing polymer further comprises:

perfluoroalkoxy.

5. The apparatus of claim 1 wherein the fluorine-containing polymer further comprises:

fluorinated ethylene propylene.

6. The apparatus of claim 1 wherein the cryogenic fluorine-containing polymer seal being weaker than the retainer provides that when the cryogenic fluorine-containing polymer seal expands and contracts in response to temperature changes the cryogenic fluorine-containing polymer seal follows the housing.

7. The apparatus of claim 1 wherein the cryogenic fluorine-containing polymer seal further comprises:

a radial seal.

8. An apparatus comprising:

an assembly comprising a main spring housing assembled with a cryogenic fluorine-containing polymer seal, wherein the fluorine-containing polymer bears compressive loads and wherein the fluorine-containing polymer has a fluidized state; and a retainer coupled to the assembly, wherein the cryogenic fluorine-containing polymer seal is weaker than the retainer providing that when the fluorine-containing polymer seal expands and contracts in response to temperature changes the seal follows the retainer and providing that when the cryogenic fluorine-containing polymer seal expands and contracts in response to temperature changes the seal follows the housing which provides that the fluorine-containing polymer contained in the seal is under constant pressure, thus fluidizing and retaining the fluorine-containing polymer.

9. The apparatus of claim 8 wherein the main spring housing further comprises:

an austenitic nickel-based superalloy.

10. The apparatus of claim 8 wherein the main spring housing further comprises:

stainless steel.

11. The apparatus of claim 8 wherein the fluorine-containing polymer further comprises:

perfluoroalkoxy.

12. The apparatus of claim 8 wherein the fluorine-containing polymer further comprises:

fluorinated ethylene propylene.

13. The apparatus of claim 8 wherein the seal further comprises:

a radial seal.

14. An apparatus comprising:

an assembly comprising a main spring housing assembled with a cryogenic fluorine-containing polymer seal, wherein the fluorine-containing polymer bears compressive loads and wherein the fluorine-containing polymer has a fluidized state; and a retainer coupled to the assembly, wherein edges of the retainer are swaged over the main spring housing, wherein the cryogenic fluorine-containing polymer seal is weaker than the retainer providing that when the cryogenic fluorine-containing polymer seal expands and contracts in response to temperature changes the seal follows the retainer and providing that when the cryogenic fluorine-containing polymer seal expands and contracts in response to temperature changes the seal follows the housing which provides that the fluorine-containing polymer contained in the seal is under constant pressure, thus fluidizing and retaining the fluorine-containing polymer.

15. The apparatus of claim 14 wherein the main spring housing further comprises:

an austenitic nickel-based superalloy.

16. The apparatus of claim 14 wherein the main spring housing further comprises:

stainless steel.

17. The apparatus of claim 14 wherein the fluorine-containing polymer further comprises:

perfluoroalkoxy.

18. The apparatus of claim 14 wherein the fluorine-containing polymer further comprises:

fluorinated ethylene propylene.

19. The apparatus of claim 14 wherein the seal further comprises:

a radial seal.

* * * * *